United States Patent
Kakehi et al.

Patent Number: 6,087,026
Date of Patent: Jul. 11, 2000

[54] MAGNETORESISTIVE HEAD AND MAGNETIC READ/WRITE DEVICE

[75] Inventors: Masahiro Kakehi; Yuji Uehara, both of Kawasaki, Japan

[73] Assignee: Fujitsu Limited, Kawasaki, Japan

[21] Appl. No.: 08/957,188

[22] Filed: Oct. 24, 1997

[30] Foreign Application Priority Data

Jun. 4, 1997 [JP] Japan .................................. 9-146830

[51] Int. Cl.$^7$ ...................................................... G11B 5/66
[52] U.S. Cl. .............. 428/692; 428/694 R; 428/694 TR; 428/694 T; 428/694 TS; 428/694 TM; 428/900; 360/113; 324/252
[58] Field of Search .................. 428/694 R, 694 TR, 428/694 T, 694 TS, 694 TM, 900, 692; 360/113; 324/252

[56] References Cited

U.S. PATENT DOCUMENTS 5,549,978  8/1996  Iwasaki .................................. 428/692

FOREIGN PATENT DOCUMENTS

| 5182148 | 7/1993 | Japan . |
| 6338034 | 12/1994 | Japan . |
| 7509811 | 10/1995 | Japan . |
| 7509812 | 10/1995 | Japan . |

Primary Examiner—Leszek Kiliman
Attorney, Agent, or Firm—Greer, Burns & Crain

[57] ABSTRACT

A MR head employs a biasing soft magnetic film of a FeXN-based alloy which undergoes no change in the direction of its axis of easy magnetization even when subject to heat treatment. The MR head has an anisotropic magnetic field size of 10 Oe or greater, and electrical resistance p of 70 $\mu\Omega$cm or greater, and a saturation flux density Bs of 1 T or greater. The direction of the axis of easy magnetization of the biasing soft magnetic film is oriented perpendicular to the direction of sense current, and the direction of the axis of easy magnetization of the MR film is oriented parallel to the sense current direction.

10 Claims, 1 Drawing Sheet

MAGNETORESISTIVE HEAD AND MAGNETIC READ/WRITE DEVICE

BACKGROUND OF THE INVENTION

1. Field of the Invention

The present invention relates to a SAL (Soft Adjacent Layer) bias system magnetoresistive head used for magnetic data storage devices such as hard disks, and to a magnetic read/write device employing it.

2. Description of the Related Art

The recent increase in capacities of magnetic read/write devices used as external storage devices for computers has brought a demand for higher recording densities. As a means of meeting this demand, progressive development has been pursued on high density MR heads as magnetic heads. However, the magnetoresistive films (hereunder abbreviated to MR films) used in MR heads produce nonlinear outputs with respect to the external magnetic field when no biasing magnetic field is present. Consequently, in order to obtain a reproduced waveform corresponding to the magnetic field generated by the magnetic memory medium, it is necessary to apply a biasing magnetic field to the MR film by some method to cause the MR film to operate in a linear region. As one method of achieving this there has been proposed the SAL bias system, which gives a high biasing effect at low current.

Materials used for biasing soft magnetic films are preferred to have high electrical resistance, low magnetic resistance and a low magnetostriction constant, and are generally NiFeX (X=Cr, Rh, Nb) based alloys. Also, the direction of the easy axis of magnetization for the biasing soft magnetic film is usually oriented parallel to the direction of the easy axis of magnetization for the MR film. In some cases, as in Japanese Unexamined Patent Publication No. 6-338034, the direction of the easy axis of magnetization for the biasing soft magnetic film and the direction of the easy axis of magnetization for the MR film are oriented roughly perpendicular to each other, to thus inhibit the magnetoresistive effect produced on the biasing magnetic film and allow reading of the magnetic recording device even at a low sense current.

In this conventional construction the biasing soft magnetic film is still an NiFeX (X=Cr, Rh, Nb) based alloy and thus the value of the electrical resistance is not very high. Furthermore, the value of the saturation flux density is also insufficient and therefore the film thickness must be increased to an adequate degree to allow its use as a biasing soft magnetic film. Thus, when a sense current flows through the head there is more current flowing to the biasing soft magnetic film and less of the current flowing to the MR film, creating a problem wherein the head output can only be raised by increasing the value of the sense current. Also, when the direction of the easy axis of magnetization for the biasing soft magnetic film is oriented perpendicular to the direction of the easy axis of magnetization for the MR film, if a NiFe-based alloy is used for the biasing magnetic film the direction of the easy axis of magnetization is altered by heat treatment because of induced anisotropy of the NiFe-based alloy, thus resulting in the problem of unstable reproduction by the head.

In addition, Japanese Unexamined Patent Publication No. 5-182148 proposes, as the biasing soft magnetic film, a soft magnetic film composed of a laminate of 2 or more different magnetic materials, for example a soft magnetic film composed of a laminate of a NiFeX-based alloy film and an FeN film. This publication teaches that the FeN film alone is unsuitable for a biasing soft magnetic film, but that in combination with the NiFeX-based alloy film it is possible to have suitable soft magnetic characteristics and saturation magnetization. However, since this laminated film uses a NiFeX-based alloy film as the principal biasing soft magnetic film which is modified with the FeN film, it fails to solve the aforementioned problems associated with NiFeX-based alloy films.

The present invention overcomes these problems of the prior art, and its object is to provide an MR head with high reproduction output, which is capable of the accurate reproduction of magnetic recording media.

SUMMARY OF THE INVENTION

In order to achieve this object, the MR head of the invention is a SAL (Soft Adjacent Layer) bias system magnetoresistive head equipped with a magnetoresistive film and a biasing soft magnetic film formed in proximity to the magnetoresistive film, which is characterized in that the material of the biasing soft magnetic film is represented by FeXN (where X is Zr, Nb, Ta, W, Al or a mixture thereof).

Preferably, the easy axis of magnetization of the magnetoresistive film is oriented approximately parallel to the sense current while the easy axis of magnetization of the biasing soft magnetic film is oriented approximately perpendicular to the sense current, in order to achieve high output.

The MR head of the present invention employs as the material for the biasing soft magnetic film a FeXN (X=Xr, Nb, Ta, W, Al or a mixture thereof) based alloy. The FeXN-based alloy undergoes no change in the direction of the easy axis of magnetization even under heat treatment. Consequently, when the easy axis of magnetization of the MR film is oriented parallel to the sense current while the easy axis of magnetization of the biasing soft magnetic film is oriented perpendicular to the sense current, then for example, even if the size of the anisotropic magnetic field Hk is enlarged to obtain a high output, there is no change in the direction of the easy axis of magnetization even with heat treatment to stabilize the magnetic characteristics of the MR film. Thus the desired high output can be obtained. Furthermore, since the FeXN-based alloy can be given a high electrical resistance and large saturation flux density, the current utilization efficiency of the MR film is increased, allowing high output to be obtained.

The FeXN-based alloy is a nitride represented by $(Fe_{1-a}X_a)N_x$ where X is a metal component selected from among Zr, Nb, Ta, W, Al and combinations thereof, and preferably $0<a\leq 0.1$. Since the soft magnetic characteristics are impaired if the proportion of x is greater than 10% with respect to Fe, it is preferably no greater than 10%, and is best at 2–3%. The proportion of N may be controlled by a method such as controlling the $N_2$/Ar ratio in the sputtering atmosphere, for example, FeX is soft magnetic.

The FeXN-based alloy film used as the biasing soft magnetic film may have an anisotropic magnetic field Hk of 10 Oe or greater, an electrical resistance $\rho$ of 70 $\mu\Omega$cm or greater and a saturation flux density Bs of 1 T or greater, and each of these are the preferred values. Values within these ranges contribute to higher output for the MR head. For example, while NiFeCr has an Hk of 4 Oe, a $\rho$ of 30–40 $\mu\Omega$cm and a Bs of about 0.65 T, FeZrN may have characteristics with an Hk of 10 Oe or greater, preferably 10–20 Oe, a $\rho$ of 70 $\mu\Omega$cm or greater and a Bs of 1.0–1.3 T.

The Bs.t of the biasing soft magnetic film is preferred to be 0.6–0.7 times the Bs.t of the MR film for even better biasing efficiency of the MR film.

The FeXN-based alloy film may be formed by sputtering or any other known method.

A non-magnetic film such as Ta or Ti is usually provided between the MR film and the biasing soft magnetic film. This serves for cutting switched connections between the MR film and the biasing soft magnetic film.

According to the invention there is also provided a magnetic read/write device comprising the aforementioned magnetoresistive head and a magnetic recording medium.

An MR head according to an example of the invention will now be described with reference to the drawings.

EXAMPLE

Figure 1:
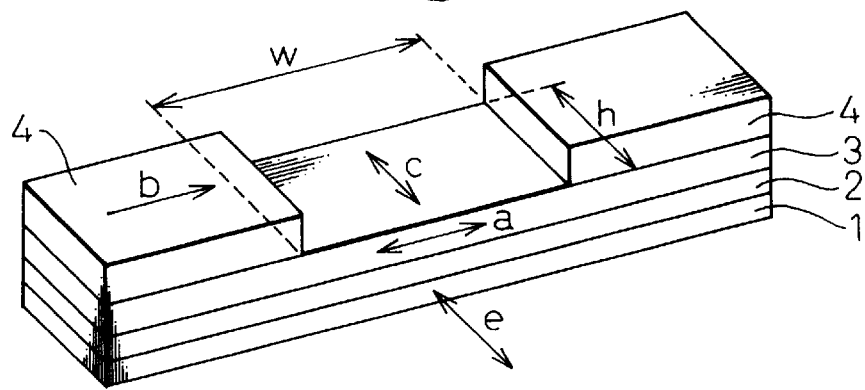
FIG. 1 is a schematic diagram of an MR head according to an example of the invention.
Figure 2:
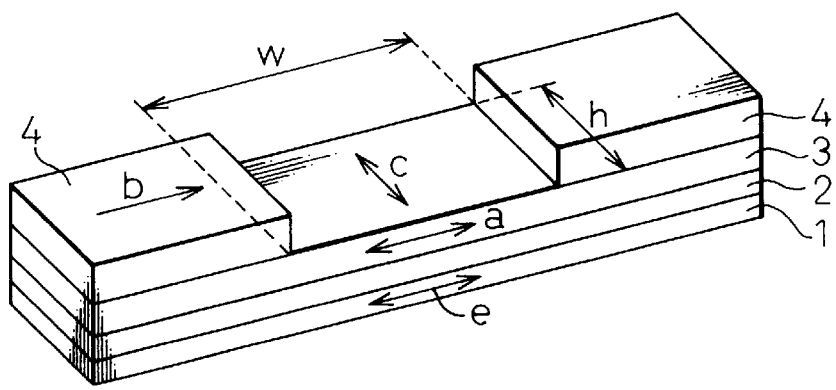
FIG. 2 is a schematic diagram of an MR head according to the prior art.

FIG. 1 is a schematic diagram of an MR head according to an example of the invention. (FIG. 2 is a schematic diagram of an MR head in the prior art.) Here, film 1 is a biasing soft magnetic film constructed of an FeXN-based alloy, film 2 is a non-magnetic intermediate film, film 3 is an MR film, direction a is the direction of easy magnetization of the MR film, direction b is the sense current direction, direction c is the input magnetic field direction, h is the height of the MR and w is the width of the MR. The patterning is designed for an MR height h of 2 μm and an MR width w of 2 μm. Numeral 4 indicates electrodes which are used as the terminals to pass a current to the MR film 3 which is used to detect resistance changes.

The process for producing the MR head constructed in the manner described above will now be explained.

First, sputtering using an FeZr (10% Zr) alloy as the target is performed in an Ar and $N_2$ atmosphere, and a film of FeZrN alloy (very slight N content, preferably 2–3%) with a Zr content of 10 at % or lower (10% or lower of the total of Fe, Zr and N) is formed so that the direction of its easy axis of magnetization is perpendicular to the sense current direction b to become the direction of the easy axis of magnetization e of the biasing soft magnetic film, to form a biasing soft magnetic film 1 with a thickness of 7 nm. The size of the anisotropic magnetic field of the FeZrN alloy is 10 Oe or greater, the value of the electrical resistance is 70 μΩcm and the size of the saturation flux density is 1 T or greater.

Next, a Ta film is formed by sputtering on the biasing soft magnetic film 1 to form a non-magnetic intermediate film 2 with a thickness of 5 nm or 10 nm. A NiFe film is then laminated on the non-magnetic intermediate film 2 as the MR film with the direction of the easy axis of magnetization oriented parallel to the sense current direction b, to become the direction of the easy axis of magnetization of the MR film, in order to form an MR film 3 with a thickness of 11 nm.

Then, to stabilize of the magnetic characteristics of the MR film, heat treatment (approximately 280° C., 1 hour) is performed in a magnetic field so that the applied magnetic field direction is aligned with the direction of the easy axis of magnetization of the MR film. The direction of the easy axis of magnetization of the biasing soft magnetic film does not change even with this heat treatment.

The MR head according to this example of the invention, produced in the manner described above, was compared with a conventional MR head in terms of performance. The results are explained below.

Comparative Example

Figure 3:
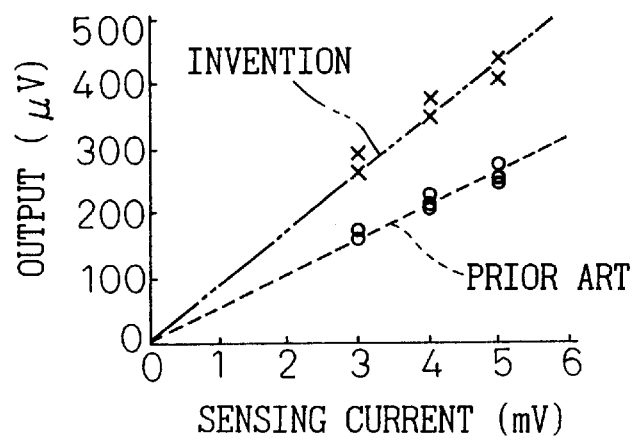
FIG. 3 is a graph showing the sense currents and outputs for MR heads according to the example and the prior art.

Using a conventional MR head of the same type as the MR head of the example, except for laminating an NiFeCr alloy so that the direction of its easy axis of magnetization was oriented in the direction of the easy axis of magnetization of the biasing soft magnetic film, a direct sense current was passed from the electrode film 4 and the output was measured upon application of an alternating current magnetic field in the direction of the easy axis of magnetization of the MR film as the input magnetic field for the MR film. FIG. 3 shows the output obtained upon varying the sense currents of the MR heads of the prior art and the invention.

As seen in FIG. 3, an improvement in output was achieved by constructing the MR head according to the example of the invention compared to the prior art.

As explained above, the present invention employs an FeXN-based alloy as the material for the biasing soft magnetic film, the FeXN-based alloy being one which undergoes no change in the direction of its axis of easy magnetization even when subjected to heat treatment, and particularly having an anisotropic magnetic field size of 10 Oe or greater, an electrical resistance p of 70 μΩcm or greater and a saturation flux density Bs of 1 T or greater. The direction of the axis of easy magnetization of the biasing soft magnetic film is oriented perpendicular to the direction of the sense current and the direction of the axis of easy magnetization of the MR film is oriented parallel to the sense current direction, to thereby improve both the current utilization efficiency of the MR film and the biasing efficiency, making it possible to produce MR heads with large reproduction output capability.

We claim:

1. A magnetoresistive head, comprising;
   a magnetoresistive film having a magnetization direction in a first direction;
   first and second electrodes connected to said magnetoresistive film for passing a sensing current through said magnetoresistive film in said first direction; and
   a soft adjacent layer (SAL) of a soft magnetic material formed adjacent to said magnetoresistive film, said SAL having a magnetization direction in a second direction different from said first direction, wherein said SAL is made of a material represented by FeXN where X is selected from the group consisting of Zr, Nb, Ta, W, Al and combinations thereof.

2. A magnetoresistive head according to claim 1, wherein the easy axis of magnetization of said magnetoresistive film is oriented parallel to the sense current, and the easy axis of magnetization of said biasing soft magnetic film is oriented perpendicular to the sense current.

3. A magnetoresistive head according to claim 1 or 2, wherein the value of the anisotropic magnetic field of said magnetoresistive film is 10 Oe or greater, the value of the electrical resistance p is 70 μΩcm or greater and the value of the saturation flux density Bs is 1 T or greater.

4. A magnetoresistive head according to claim 1, wherein a non-magnetic intermediate film is inserted between said magnetoresistive film and said biasing soft magnetic film.

5. A magnetoresistive head according to claim 1, wherein said FeXN has a composition represented by the formula $(Fe_{1-a}X_a)N_x$ wherein $0<a \leq 0.1$ and x is less than 0.1.

6. A magnetoresistive head according to claim 5, wherein x is in a range of 0.02 to 0.03.

7. A magnetoresistive head according to claim 1, wherein said magnetoresistive film is of NiFe.

8. A magnetoresistive head according to claim 1, wherein a value of Bs.t of said biasing soft magnetic film is 0.6 to 0.7 times of that of said magnetoresistive film.

9. A magnetic read/write device characterized by comprising a magnetoresistive head according to any of claims 1 to 8 and a magnetic recording medium.

10. The magnetoresistive head according to claim 1, wherein said SAL has a magnetization direction in a direction perpendicular to said first direction.

* * * * *

UNITED STATES PATENT AND TRADEMARK OFFICE
CERTIFICATE OF CORRECTION

PATENT NO. : 6,087,026
DATED : July 11, 2000
INVENTOR(S) : Kakehi et al.

It is certified that error appears in the above-identified patent and that said Letters Patent is hereby corrected as shown below:

Column 4, line 45, please delete "value" and insert --size-- therefor.

Column 4, line 46, please delete "value" and insert --size-- therefor.

Column 4, line 47, please delete "value" and insert --size-- therefor.

Signed and Sealed this

First Day of May, 2001

Attest:

NICHOLAS P. GODICI

Attesting Officer

Acting Director of the United States Patent and Trademark Office